United States Patent [19]

Shaw

[11] 4,280,679
[45] Jul. 28, 1981

[54] DUALLY-OPERATED TANK CAR BOTTOM UNLOADING VALVE

[75] Inventor: Harry N. Shaw, Hendersonville, N.C.

[73] Assignee: The Protectoseal Co., Bensenville, Ill.

[21] Appl. No.: 67,475

[22] Filed: Aug. 17, 1979

[51] Int. Cl.³ .............................................. F16K 31/52
[52] U.S. Cl. ................................... 251/144; 251/233; 251/289
[58] Field of Search ...................... 251/144, 289, 233; 137/347, 350

[56] References Cited

U.S. PATENT DOCUMENTS

| | | | |
|---|---|---|---|
| 2,512,877 | 6/1950 | Rike | 251/144 X |
| 3,656,710 | 4/1972 | Shaw | 251/144 |
| 4,180,242 | 12/1979 | Reedy | 137/382.5 |
| 4,184,663 | 1/1980 | Rollins et al. | 137/382.5 X |

FOREIGN PATENT DOCUMENTS 601346 7/1934 Fed. Rep. of Germany ........... 251/144

Primary Examiner—William R. Cline
Attorney, Agent, or Firm—Rummler & Snow

[57] ABSTRACT

A tank car bottom unloading valve that meets A.A.R. specifications which can be dually-operated either from above or below the tank, wherein the valve is retained in a heavy, longitudinally sloped mounting flange by a segmented ring which does not interfere with the valve actuating mechanism and yet allows the containment of the valve up inside the tank so as not to result in hazardous protrusion of the body of the valve from the bottom of the tank. Said vale is shut from below by an over-center cam and link mechanism which locks the valve poppet on its seat through a resilient compression spring but which does not lock-up the valve when it is shut from above, so that lower working torque is required by the operator and less maximum stress is imposed on the valve in its operation, and there is less criticality of adjustment upon assembly. A valve actuating lever disengages from the over-center cam and link mechanism for rotation and hookup in an out-of-the-way place below the tank car.

9 Claims, 6 Drawing Figures

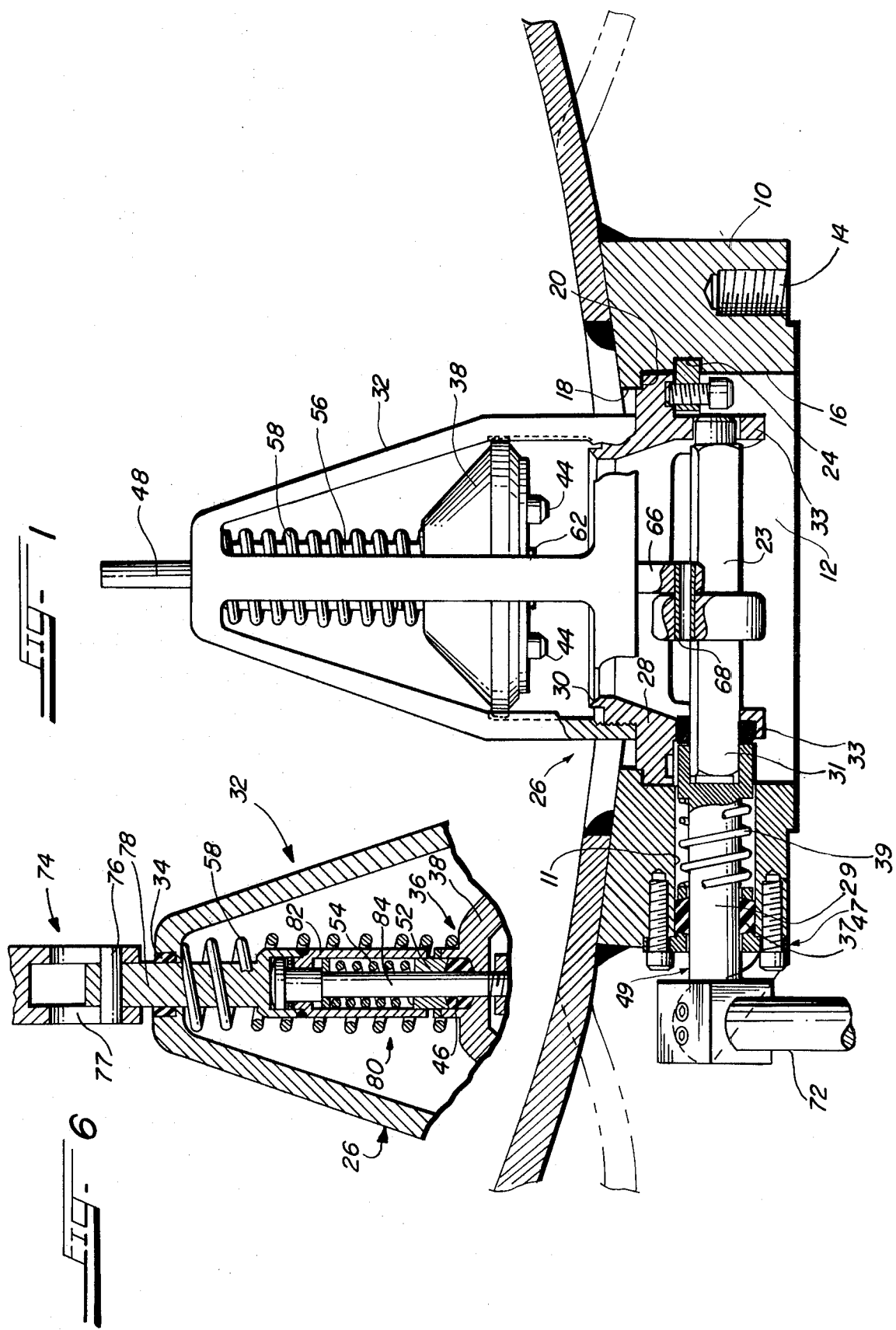

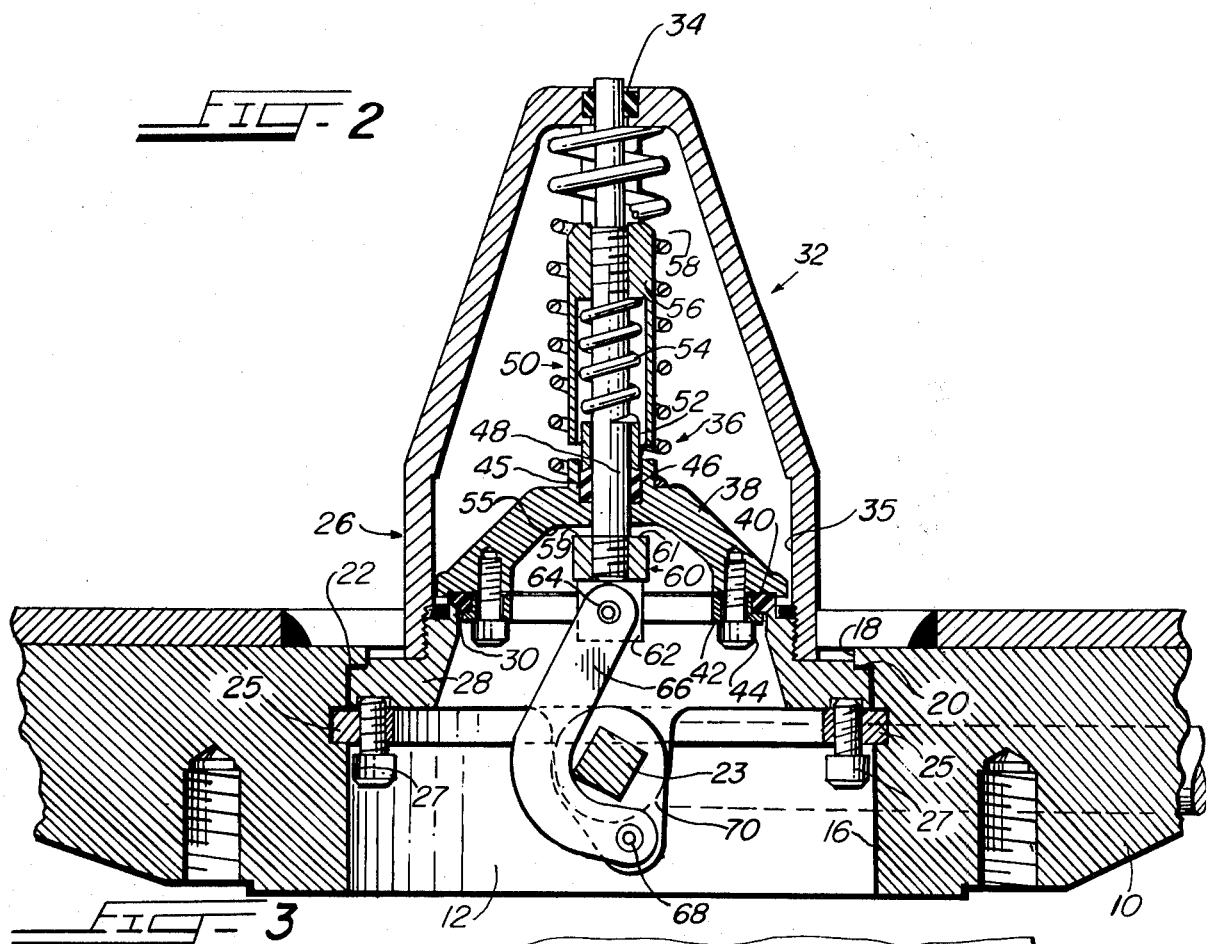

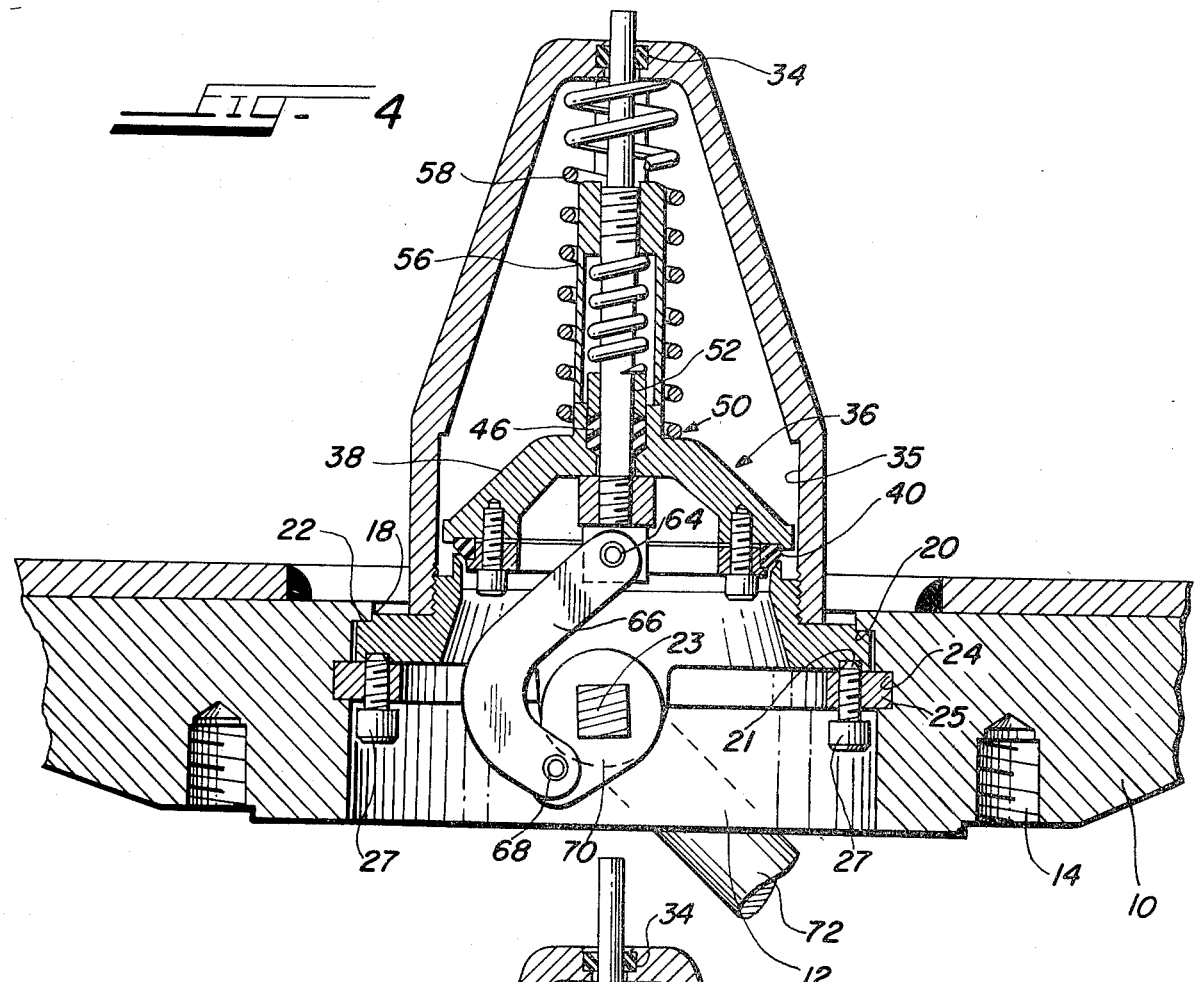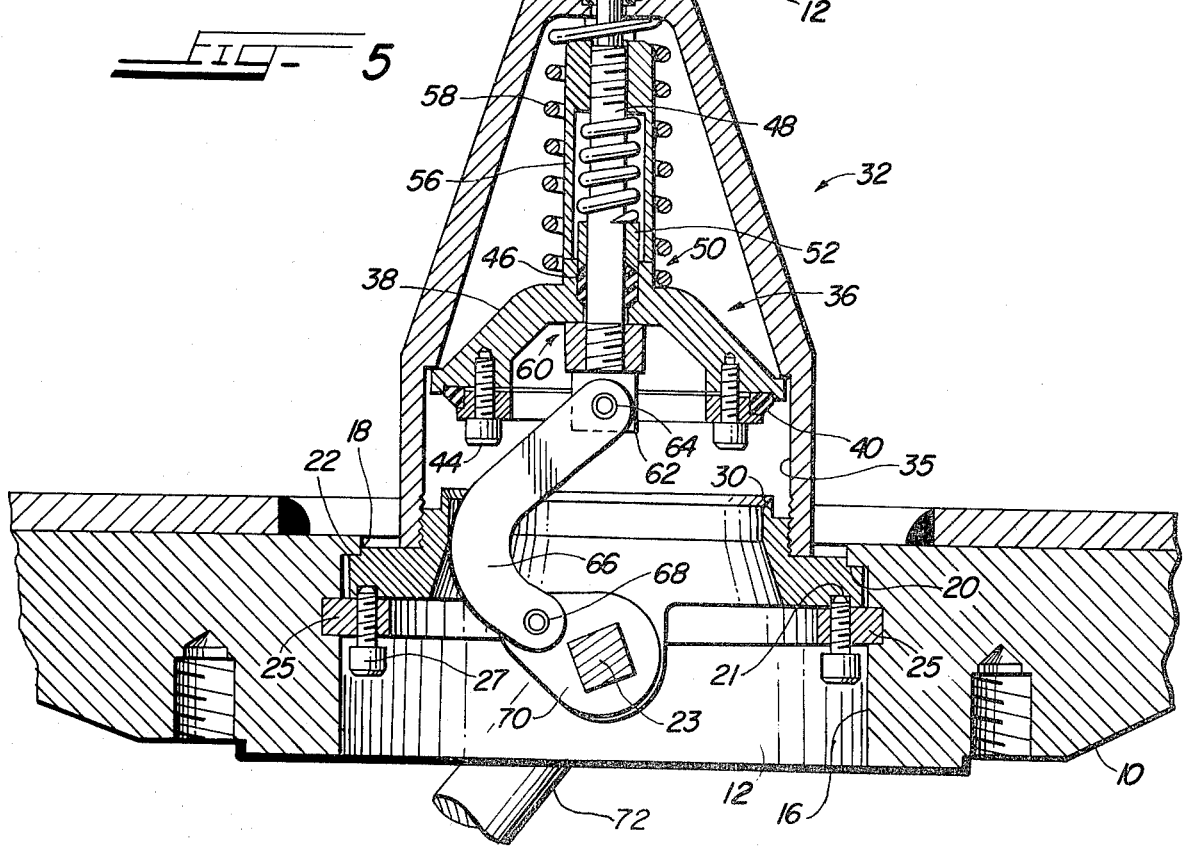

DUALLY-OPERATED TANK CAR BOTTOM UNLOADING VALVE

BACKGROUND OF THE INVENTION

The prior art in bottom operated unloading valves for general service tank cars is characterized by hazardous exposure of a portion of the body of the valve from below the car. This protrusion arises because flanges for adapting the valve body to the wall of the tank require outlet section breakoff grooves or shear bolts as protective devices in the attachment of the body of the valve to the tank, and valve bodies require bolted-up retaining rings or flanges of conventional design which impose severe constraints on the design considerations available for low profile tank car bottom unloading valves. Also, conventional over-center cam and link valve actuating mechanisms require high operating torque and can be over-stressed when locking up and unlocking and opening the valve, especially if the mechanism is not properly adjusted.

There is an established need for a bottom unloading valve having a low profile which can be dually-operated from either the bottom or top and does not require adjustment on assembly. Said valve should not leak under impact, have low operator working torque and less maximum stress on the valve during operation.

SUMMARY OF THE INVENTION

The gist of this invention lies in a two-piece tank car bottom unloading valve having a heavy, elliptically-shaped, longitudinally sloped mounting flange, which is welded to the bottom of the tank car and isolates the body of the valve from structural distortion of the wall of the tank due to impact, and a body, which separately mounts in the flange and extends up into the tank rather than protruding therefrom. A segmented ring, which does not interfere with the valve actuating mechanism, mounts in a circumferential groove in a bore in the flange and retains the valve body in sealing relation against a shoulder on the mounting flange by means of threaded engagement with a plurality of capscrews which are spaced along the length of each segment and cooperate with a face groove in the bottom ring of the valve body to force said ring against said shoulder in the bore. A compliant device, which is adapted for cooperation between the over-center cam and link valve actuating mechanism and the valve poppet, clamps the poppet on its seat during lock-up, and eliminates overstress in the link therein when it works against manufacturing tolerances stacked up in the assembly of parts and non-resilient seating characteristics of the valve disc alone during operation of the valve.

DESCRIPTION OF THE DRAWINGS

FIG. 1 (solid line) shows a fragmented cross-sectional side view of an installed bottom-unloading valve of this invention;

FIG. 1 (phantom line) shows the same installed in an impacted and structurally distorted tank car;

FIG. 2 shows a fragmented cross-sectional side view of the locked-up valve taken at right angles to that of FIG. 1;

FIG. 3 shows a bottom view of the same;

FIG. 4 shows a fragmented cross-sectional side view of the cracked-open valve of FIG. 2;

FIG. 5 shows a fragmented cross-sectional side view of the full-open valve of FIG. 2; and FIG. 6 shows a fragmentary cross-sectional side view of the dually-operated valve of FIG. 1.

THE PREFERRED EMBODIMENT

Reference to FIGS. 1 and 2 shows an elliptically-shaped, longitudinally sloped mounting flange 10 which is welded to the bottom surface of the wall of a typical general service tank car with a weld bear around the juncture between the inner edge of an aperture 12 in the bottom of the tank and the top face of the flange 10 and around the juncture of the outer taper edge of the same and the bottom surface of the tank. A pilot 13 depends from the bottom face of the flange 10 for locating an outlet connection (not shown) in concentric relation with the aperture 12. The connection is retained on the flange 10 in threaded bolt-holes 14 by four equally-spaced bolts (not shown) on a bolt-circle, as shown in FIGS. 1 and 3. Mounting flange 10 comprises a large bore 16 extending upward through its thickness. Bore 16 is stepped down to a slightly smaller bore 18 by shoulder 20 adjacent to the top face thereof.

An annular teflon gasket 22 lays on the shoulder 20 in flange 10. A concentric, rectangularly-shaped, circumferential groove 24 opens outward in bore 16 slightly more than midway up the thickness of flange 10. Three circular segments 25 mount in the circumferential groove 24 in unequal and antisymmetrical, angular-spaced relation about a horizontal axis through the body of flange 10 below ring segments 25, as shown in FIGS. 2 and 3.

A valve body 26, having a shouldered sealing ring 28, seats on the gasket 22 on shoulder 20 in mounting flange 10 and is piloted therein by bore 18. A rectangularly-shaped, circumferential face-groove 21 opens downward in the bottom of ring 28 in concentric relation with the bore 18. Capscrews 27 threadedly engage each of segments 25 from below having their top ends engaging the circumferential groove 21, for retaining the sealing ring 28 of the valve 26 against gasket 22 on shoulder 20 of mounting flange 10. Valve body 26 comprises a 45° valve seat 30 which mounts on an annular, externally-threaded, upward extension of the sealing ring 28 of valve 26 in concentric relation with the bore 18.

A valve guide and lock-up assembly 32, as shown in FIG. 2, having a small, teflon-bushed, stepped bore 34 in its top portion and a large, stepped bore 35 in its bottom, both in mutual concentric relation with bore 18, threadedly engages its bottom portion with the upward extension of the sealing ring 28 within the valve body 26 and further extends upward through the aperture 12 into the interior of the tank. A valve poppet assembly 36 operationally mounts in the guide and lock-up assembly 32 and comprises a circular poppet 38 which pilots in the larger bore 35 in the bottom portion of guide and lock-up assembly 32. A 45° teflon valve disc 40 for seating on valve seat 30 mounts on retainer 38, and is held thereon by a shouldered disc holder 42 using capscrews 44. A small stepped bore 45 which is concentric in poppet 38 contains a teflon rod packing 46.

A square valve stem 23 having cylindrically-journaled ends rotationally mounts in bushed trunion 33 which depends from valve body 26 below and in equal spaced, diametral relation about union ring 60 on valve guide and lock-up assembly 32. A squared drive end 31 extends from one end of valve stem 23. A dog clutch valve actuating assembly 49 having a round stem 29 and a square socketed end manually engages the socketed end to the squared drive end 31 of stem 23 and rotationally mounts in a bore 11 of flange mount 10. A stem gland 47 having a packing 37 backed up by a compression spring 39 engages the round valve actuating stem 29 in the bore 11 for sealing the same when transfer pipe connection (not shown) is made to the bottom of the flange mount 10.

A crossbored valve-operating and guide rod 48 slidingly cooperates with the bushed bore 34 in the top portion of guide and lock-up assembly 32 and the packed bore 45 in disc retainer 38. A slidable compliance and rod packing assembly 50 mounts around the operating and guide rod 48 above the packing 46 in poppet 38, having a rod gland 52 bearing on the packing 46 from above. A rod lock-up and packing compression spring 54 bears on the gland 52 and disc retainer 38 from above and a compliance and packing spring holder 56 threadedly engages the top portion of the valve lock-up and guide rod 48 within the guide and lock-up assembly 32 and bears on the top of the rod packing and lock-up compression spring 54.

A main self-closing valve compression spring 58 mounts around the valve-operating and guide rod 48 and the slidable compliance and rod packing assembly 50 between the top portion of the guide and lock-up assembly 32 and poppet 38. A union ring 60 carries a shoulder 61 having a diameter which is larger than the small bore of the stepped bore 45 in poppet 38. A crossbored tab 62 depending from union ring 60 threadedly engages the bottom end of rod 48 below poppet 38. A riveted, button-headed link-pin 64 rotationally engages one end in the crossbored tab 62. A crossbored link 66 force fits at its upper end on and is supported by the other end of linkpin 64. A button-headed arm pin 68 force fits one end in and is supported by crossbored link 66 at its lower end. A cross-bored, square-bored arm 70 operationally mounts on and is set-screwed to square valve stem 23 and rotationally engages the other end of arm pin 68. A valve-actuating lever 72 linchpins to the other end of valve-actuating stem 29.

Reference to FIG. 6 shows a clevis 74 operationally-connected to the top end of crossbored valve-operating rod 48 having a pin 76 force-fitted therein. Diametrically-opposed longitudinal slots 77 in each arm of clevis 74 slidingly engage the pin 76 on each side of rod 48 to allow for the separate opening of the valve from above or below.

A modified valve guide and lock-up assembly 32, as shown in FIG. 6, having a small, teflon-bushed, stepped bore 34 in its top portion and a large, stepped bore 35 (not shown) in its bottom, both in mutual concentric relation with bore 18, threadedly engages its bottom portion with the upward extension of the sealing ring 28 (not shown) within the valve body 26 and further extends upward through the aperture 12 into the interior of the tank. A valve poppet assembly 36 operationally mounts in the guide and lock-up assembly 32.

A main, self-closing valve compression spring 58 mounts around the valve-operating rod 78 and the slidable compliance and rod packing assembly 80. The assembly 80 comprises a rod gland 52 bearing on the packing 46 from above. A rod lock-up and packing compression spring 54 bears on the gland 52 and disc retainer 38 from above, and a compliance and packing spring holder 82 rotationally engages the headed top portion of the valve lock-up and guide rod 84 as a swivel connection and within the guide and lock-up assembly 32 and bears on the top of the rod packing and lock-up compression spring 54.

In the operation of the bottom unloading valve of this invention, reference to FIGS. 1 (solid line) and 2 shows a typical tank car installation of the valve body 26 in a normal undeformed tank having the poppet 38 held in an open position above valve seat 30 by the action of arm 70 and link 66 of lock-up assembly 32 on valve stem 23 by the operator using lever 72 engaged with stem 23 and rotating the same. FIG. 1 (phantom line) shows the valve body 26 in an impacted and structurally distorted tank car. In FIGS. 2 and 4, the lever 72 has been swung through about 40° of arc by the operator sliding rod 48 up through packing assembly 50 a position for maximizing the mechanical advantage of the cam 70 and link 66 and opening the poppet 38 from seat 30, taking up the slack 59 between the top face 61 of union ring 60 and the bottom face 55 of the poppet 38 by contacting the same. In FIG. 5, the lever 72 has been swung through about 140° of arc by the operator maximizing the upward movement of the cam 70 and link 66 and lifting the poppet 38 from seat 30 to full open with the union ring 60 under the bottom face 55 of the poppet 38 contacting the same.

Although but one specific embodiment of this invention is herein shown and described, it will be understood that details of the construction shown may be altered or omitted without departing from the spirit of the invention as defined by the following claims.

What is claimed is:

1. A valve having a normally-closed poppet and a seat mounted in a valve body for bottom unloading of a tank comprising:
    (a) a flange mounting in a sealing relation on the bottom of the tank, having a large bore in fluid communication with the tank;
    (b) a ring on said valve body mounted in the large bore of said flange in sealing relation therewith, and said valve body extending wholly within said tank;
    (c) a valve actuating means having an overcenter lockup means operationally guided by the body of the valve for limiting the clamping of the poppet of said valve on its seat;
    (d) a valve body retention means cooperatively mounted between said large bore and said ring;
    (e) a small bore in said flange intersecting said large bore at right angles thereto below the ring on said valve body;
    (f) a pair of trunions mounted on the diameter of the bottom face of said ring;
    (g) an actuating stem rotationally mounted in the trunions and extending through and out the small bore having a coupling means at one end therein;
    (h) a lever operationally mounted on the other end of said coupling means;
    (i) an arm fixedly mounted at one end to said stem between said trunions;
    (j) a pin operationally mounted at the other end of said arm;
    (k) a link operationally connected at one end thereof to said arm pin;
    (l) a union ring pinned to the other end of said link;
    (m) a guide rod fixedly connected at its bottom end to said union ring and slidingly connected up through a normally-closed poppet and the top of said valve having zero clearance between the bottom of said poppet and the top of said union ring; and (n) a compliant means mounted between the top of said poppet and said guide rod above.

2. A valve as set forth in claim 1 wherein the valve actuating means for operation from above comprises:
(a) a clevis extending upwardly through the tank having diametrally opposed slots vertically disposed therein; and
(b) a transverse pin fixedly mounted on and extending through the top end of the guide rod slidingly engaging the slots in said clevis.

3. A valve as set forth in claim 1 wherein the valve retention means comprises:
(a) an annular groove in said large bore intersecting said small bore in the flange;
(b) a face groove in the bottom of said ring on the valve body; and
(c) a plurality of segmented means mounting in said annular groove in the large bore spaced without interfering with said valve actuating means in the small bore having spaced capscrews threadedly mounted therein cooperating with said face groove in said ring.

4. A valve as set forth in claim 3 wherein the segmented means comprises three circular segments having a plurality of capscrews threadedly engaging the same.

5. A valve as set forth in claim 1 wherein the compliant means comprises a helically-coiled compression spring.

6. A valve as set forth in claim 1 wherein the coupling means comprises a manually-engaged dog clutch.

7. An actuator for a normally-closed poppet valve having an inlet guide bushing therefor and a seat ring installed in a large bore in a mounting flange and operating from outside the seat ring of the same comprising:
(a) a small bore in the mounting flange intersecting the large bore at right angles;
(b) a pair of trunions mounted on the outside of said seat ring;
(c) an actuating stem rotationally mounted in the trunions and extending through and out the small bore in the mounting flange having a coupling means on the outstanding end;
(d) a handle operationally mounted on the other end of said coupling means and extending at right angles thereto;
(e) an arm fixedly mounted at one end to the stem between said trunions;
(f) a pin operationally mounted at the other end of said arm and extending at right angles thereto;
(g) a link operationally connected at one end thereof to said arm pin;
(h) a union ring operationally pinned to the other end of said link;
(i) a guide rod fixedly connected at one end to said union ring and slidingly connected through the poppet of said valve and the inlet guide bushing of the same having a working clearance between said poppet and the union ring; and
(j) a compliance means mounted between the poppet and said guide rod.

8. A valve as set forth in claim 7 wherein the compliance means comprises a helically-coiled compression spring.

9. A valve as set forth in claim 7 wherein the coupling means comprises a dog clutch.

* * * * *